United States Patent [19]
Chaussade et al.

[11] Patent Number: 5,766,755
[45] Date of Patent: Jun. 16, 1998

[54] LAMINATED SAFETY PANE FOR AIRCRAFT

[75] Inventors: Pierre Chaussade; Catherine Heutte, both of Sully Sur Loire, France

[73] Assignee: Saint-Gobain Vitrage International, Courbevoie, France

[21] Appl. No.: 927,006

[22] Filed: Aug. 10, 1992

[30] Foreign Application Priority Data

Aug. 14, 1991 [FR] France .................................. 91 10351

[51] Int. Cl.⁶ .......................... B32B 17/10; B32B 27/30; B32B 27/40
[52] U.S. Cl. ................. 428/332; 428/425.3; 428/425.5; 428/425.6; 428/428; 428/429; 428/437
[58] Field of Search ....................... 428/332, 334, 428/425.5, 425.6, 437, 213, 214, 215, 425.3, 428, 429; 52/408; 156/106, 108; 427/421; 204/192.1

[56] References Cited

U.S. PATENT DOCUMENTS 3,920,878  11/1975  Fariss et al. ........................ 428/437
3,979,548   9/1976  Schafer et al. ................. 428/425.6 X
4,409,266  10/1983  Wieczorrek et al. .................. 427/302
4,810,583   3/1989  Brown et al. ....................... 428/425.6
5,019,443   5/1991  Hall .................................. 428/215

FOREIGN PATENT DOCUMENTS

A-0 190 517  8/1986  European Pat. Off. .
A-0 229 326  7/1987  European Pat. Off. .
A-0 418 123  3/1991  European Pat. Off. .
A-2 153 037  4/1973  France .
A-2 409 857  6/1979  France .

Primary Examiner—D. S. Nakarani
Attorney, Agent, or Firm—Oblon, Spivak, McClelland, Maier & Neustadt, P.C.

[57] ABSTRACT

A laminated safety pane for an aircraft comprises a glass sheet intended to be on the side of the pane facing the interior of the cabin of the aircraft, the glass sheet being coated, on its surface facing the interior of the cabin with a transparent anti-splinter covering and protection film for the glass sheet, of a polyurethane having a high capacity for elastic deformation.

4 Claims, 1 Drawing Sheet

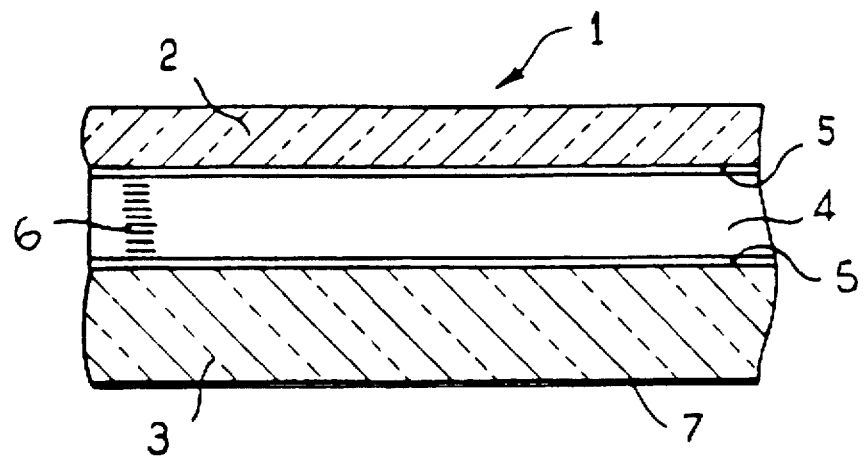
FIG_1
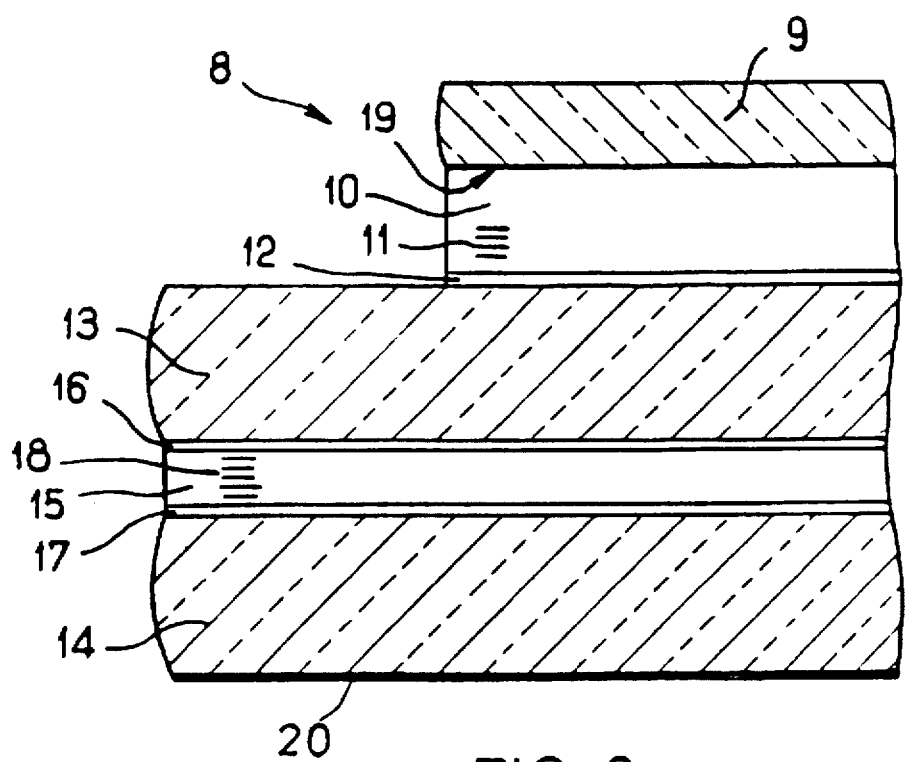
FIG_2

LAMINATED SAFETY PANE FOR AIRCRAFT

BACKGROUND OF THE INVENTION

1. Field of the Invention

The present invention relates to a safety pane for aircraft, notably a windscreen or lateral glazing pane for a pressurized cockpit.

2. Discussion of the Background

Laminated glass panes for aircraft are constituted of several glass sheets or plies, generally two or three in number, and of intermediate thermoplastic sheets of plasticized polyvinyl butyral (PVB) and/or of polyurethane. These panes are designed for maintaining pressurization inside the aircraft in the event of an accidental breakage for one reason or another of one of the glass sheets.

When the sheet or ply in question is the one on the face towards the interior of the cabin, fracturing or cracking of the glass may propagate over the entire extent of the pane, following forms of propagation that are a function of the type of reinforcement or toughening treatment to which the glass is subjected. This reinforcement may be a thermal toughening, a chemical toughening or an annealing. When the glass is thermally toughened, its fragmentation generally does not create splinters or free fragments starting from and along the fracture. In contrast, if the glass is chemically toughened or if it is annealed, the fragmentation may generate small splinters, needles or chips along the fracture lines.

When the fracture of the glass facing towards the interior of the cabin occurs at altitude, notably under the effect of thermal stresses, the internal pressure in the cabin keeps the pane in compression and the splinters on the face of the pane. When the aircraft loses altitude, however, the new pressure equilibrium to which the pane is subjected can lead to an opening of the fractures and possibly the release of the splinters. A need therefore continues to exist for a laminated glass which eliminates the risk of release of splinters into a cockpit or cabin upon fracturing of the glass.

SUMMARY OF THE INVENTION

Accordingly, one object of the present invention is to provide a laminated pane construction for aircraft which overcomes the risk of release or projection of splinters into the cockpit or cabin in the case of breakage of the glass sheet facing towards the interior of said cabin, notably under the effect of thermal stresses.

Briefly, this object and other objects of the present invention as hereinafter will become more readily apparent can be attained by a laminated safety pane for aircraft, comprising a glass sheet intended to be on the side of the pane facing the interior of the cabin of the aircraft, the glass sheet being coated on its surface facing the interior of the cabin with a transparent anti-splinter covering and protection film for the glass sheet, of a polyurethane having a high capacity for elastic deformation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view of a laminated safety pane of the invention containing two glass sheets; and FIG. 2 is a cross-sectional view of another embodiment of the safety pane of the invention containing three glass sheets.

DETAILED DESCRIPTION OF THE PREFERRED EMBODIMENTS

The term splinters, as used in the description of this invention, means predominantly glass fragments in the form of fine needles or chips, generally very light, which can become detached from the glass starting from the rupture lines. These splinters are different from those which become detached from the intermediate sheet when a thermally toughened glass breaks under impact (birdstrike for example).

The glass sheet coated with the anti-splinter film of the invention preferably is a chemically toughened glass sheet; that is to say, a glass sheet which has undergone a chemical strengthening treatment which itself is known. This treatment consists, for example, of ion exchange in the surface layers of the glass, the ions of small size being replaced by ions of large size. A chemically toughened glass sheet generally has layers at a higher compression, but of smaller thicknesses than those present in thermally toughened glass sheets. It may, therefore, be more likely to form small splinters or needles as defined above, in the case of a fracture.

In one embodiment of the laminated glazing pane of this invention, the glass sheet coated with the anti-splinter film is brought into contact, on its face remote from the face coated with the anti-splinter film with a layer or ply of a plastic material chosen from among a plasticized polyvinyl butyral having a high plasticizer content, using a usual plasticizer, ranging between 30 and 45 parts by weight of plasticizer per 100 parts by weight of PVB resin, and a thermoplastic polyurethane. The contact between the glass sheet and this layer or ply, which is preferably PVB having a high plasticizer content, produces a greater resistance of the glazing pane to fracture, notably by cleavage of the glass and thus the formation of splinters. Thus the combination of the anti-splinter film, of a sheet of PVB having a high plasticizer content, and of the toughened, especially a chemically toughened glass sheet, sandwiched between the remaining layers, offers improved safety in comparison to that offered by the known laminated safety panes for aircraft. The resistance to fracture, notably by cleavage, is greater and, if nevertheless such a fracture should occur, the anti-splinter film will then protect the interior of the cockpit from any projection of splinters in the form of needles.

The anti-splinter coating film is, according to this invention, a transparent film of polyurethane having a high capability for elastic deformation, which is formed of a polyurethane having cross-linking bonds, that is to say a thermosetting polyurethane. The anti-splinter film of the present invention in addition fulfills a technical protective function for the surface of the glass sheet. This protection proves to be particularly advantageous, because it prevents scratching and other harmful effects resulting from mechanical action or chemical attack on the surface of the glass during the handling of the pane and when, later during use, the glass is mounted in the window opening of the cockpit, it being known that these scratches and other harmful effects could in the last resort be a partial cause of fracture of the glass sheet and thus of the creation of splinters.

This protection is preferably produced as early as possible. The protection is achieved by providing the glass sheet with the polyurethane coating before assembling with the other constituent elements of the glazing pane.

This polyurethane film has, in standard conditions of temperature, a high capability for elastic deformation, a low modulus of elasticity of less than 2,000 daN/cm$^2$, preferably less than 200 daN/cm$^2$, and an elongation at rupture exceeding 60% with less than 2% plastic deformation, preferably an elongation at rupture exceeding 100% with less than 1% plastic deformation. The preferred films of this type are thermosetting polyurethanes having an elastic modulus of approximately 25 to 200 daN/cm$^2$ and an elongation of approximately 100 to 200% with less than 1% plastic deformation These thermosetting polyurethanes are produced by reaction of an isocyanate component and a polyol component, at least one of these components having a functionality greater than 2. Suitable examples of monomers for the preparation of these thermosetting polyurethanes are, on the one hand, difunctional aliphatic isocyanates such as 1,6-hexane diisocyanate, 2,2,4-trimethyl-1,6-hexane diisocyanate, 2,4,4-trimethyl-1,6-hexane diisocyanate, 1,3-bis (isocyanatomethyl) benzene, bis(4-isocyanatocyclohexyl) methane, bis(3-methyl-4-isocyanatocyclohexyl)methane, 2,2-bis(4-isocyanatocyclohexyl) propane and 3-isocyanatomethyl-3,5,5-trimethylcyclohexylisocyanate, and also the biurets, isocyanurates and prepolymers of these compounds having a functionality of 3 or more and, on the other hand, the polyfunctional polyols, like the branched polyols such as the polyester polyols and polyether polyols obtained by reaction of polyfunctional alcohols, notably 1,2,3-propane triol (glycerol), 2,2,-bis(hydroxymethyl)-1-propanol (trimethylolethane), 2,2-bis(hydroxymethyl)-1-butanol (trimethylolpropane), 1,2,4-butanetriol, 1,2,6-hexanetriol, 2,2-bis(hydroxymethyl)-1,3-propane diol (pentaerythritol), and 1,2,3,4,5,6-hexanehexol (sorbitol), with aliphatic diacids such as malonic acid, succinic acid, glutaric acid, adipic acid, suberic acid and sebacic acid, or with cyclic ethers such as ethylene oxide, 1,2-propylene oxide and tetrahydrofuran, the polycaprolactone polyols and the polycarbonate polyols.

The molecular weight of the branched polyols preferably ranges from approximately 250 to 4,000, preferably from approximately 450 to 2,000. Mixtures of different polyisocyanates and monomeric polyols may be used. Bifunctional polyols may be added to the reaction mixtures.

The preferred polyol component is chosen from a polyether polyol having a molecular weight of approximately 450, which can be produced by condensation of 1,2-propylene oxide with a 2,2-bis(hydroxymethyl)-1-butanol and having a content of free hydroxyl groups of approximately 10.5 to 12% by weight, a weakly branched polyester polyol based upon trimethylopropane, 1,6-hexanediol, adipic acid and o- and i- phthalic acid, having an OH radical content of from 3 to 5% by weight, a trifunctional lactone polyester polyol based upon trimethylolpropane or glycerol and ε-caprolactone having a content of OH groups of from 8 to 12% by weight approximately.

The films of anti-splinter polyurethane preferably applied in the present invention are chosen from an aliphatic polyurethane which is prepared by the condensation of a biuret of 1,6-hexamethylene diisocyanate containing from 21 to 24% by weight NCO radicals with a branched aliphatic hydroxylated polyether resulting from the condensation of propylene oxide with trimethylolpropane, this polyether containing approximately 10.5 to 12% by weight of OH radicals, the NCO/OH ratio expressed by weight ranging from 0.9 to 1.1 and a polyurethane formed from a reaction mixture comprising an isocyanate component chosen from among the biurets or trifunctional isocyanates of 1,6-hexamethylene diisocyanate having an NCO radical content of 15 to 25% by weight and a polyol component selected from among the polyester polyols having a functionality greater than 2 and having an OH radical content of 3 to 12% by weight In this reaction, the reaction mixture has an NCO/OH ratio expressed in equivalents of 0.9 to 1.1 and preferably of approximately 1.

These polyurethane films have a very good resistance to scratching and abrasion.

In the application of the anti-splinter covering film on a glass sheet for an aircraft glazing pane of the invention, which pane is liable to generate splinters along the fracture lines in the case of fragmentation, it is not necessary for the film to have great thickness. For the function desired, a thickness of as low as 50 μm may be sufficient. Preferably, however, a thickness of 100 μm to 600 μm is employed. A coating of this thickness may be obtained by one or more sputterings of a reaction mixture suitable for forming the film directly on the glass sheet to be coated, the glass sheet possibly being pretreated with a priming composition and/or a polyurethane composition different from the anti-splinter film. The sputtering of the reaction mixture may be performed by means of a gun or by a revolving bowl, the mixing of the components being carried out optionally in the latter case in the sputtering head. A suitable revolving bowl device is described in Patent Publication EP 161 184. After direct sputtering onto the glass sheet, the film formed is polymerized with heat, for example by placing the glazing pane in a hot cabinet at a temperature of the order of 80° to 140° C. for a period of 5 to 30 minutes approximately.

In a variation of the process, the anti-splinter film may be in the form of a prefabricated sheet, which comprises, in addition to the film of thermosetting polyurethane, a film, notably a thermoplastic polyurethane film having properties of adhesion to the glass. It may then be a prefabricated sheet, as described for instance in French Patent Publication 2 398 606, it being understood that the prefabricated sheet in this application to an aircraft pane fulfills the anti-splinter function and the function of protecting the glass sheet. The assembling together of the prefabricated sheet and the glass sheet may be performed by calendering or dabbing.

The anti-splinter film, when it is present in the form of a sheet, may also be assembled with the glass sheet by means of an adhesive film, which itself is in the form of a sheet or a film, notably of a polyurethane. The anti-splinter film may be applied to the glass sheet to be coated when it is already assembled with the other elements of the pane. Preferably, however, in order to assure its protective function for the surface of the glass sheet as soon as possible, the anti-splinter film is applied onto said sheet while the latter is in the monolithic form, before assembling together.

For a further understanding of this invention, reference is hereby made to FIGS. 1 and 2.

FIG. 1 shows a glazing pane 1, composed of two sheets of chemically toughened glass, which are an outer glass sheet 2 of 4 mm in thickness and an inner glass sheet 3 of 6 mm in thickness, between which is disposed an intermediate layer 4 composed of 7 sheets or plies. The two outermost plies 5, in contact with the glass sheets, have a thickness of 0.76 mm and are composed of PVB having a higher plasticizer content (usual plasticizer), for example 37.5 parts by weight per 100 parts by weight of PVB resin. (In a variant, these plies may be formed of thermoplastic polyurethane). The 5 inner plies 6, of 0.5 mm thickness each, are formed of PVB having a lower plasticizer content, for example 19.5 parts by weight per 100 parts by weight of PVB resin.

The inner glass sheet 3 is coated, preferably as soon as possible before it is assembled with the other elements of the pane with a film of thermosetting polyurethane 7, of 200 μm thickness, produced by sputtering of a reaction mixture of an isocyanate component, that is a biuret of 1,6-hexamethylene diisocyanate having a free NCO radical content of 23% by weight, and of a polyol component, that is polyether polyol having a molecular weight of 450, produced by condensation of 1,2-propylene oxide with 2,2-bis(hydroxymethyl)-1-butanol having a free OH radical content of 1.1. The ratio of NCO/OH equivalents in the mixture of approximately 0.8. To the polyol component there may be added dibutyl tin dilaurate as catalyst, a fluoroalkylated ester as spreading agent, and a bis (1,2,2,6,6-pentamethyl-4-piperidyl) sebacate as light protection agent. The film is polymerized at 100° C. for 20 minutes.

Before the sputtering of this reaction mixture onto the chemically toughened glass sheet, the sheet undergoes a treatment by a primer of the silane type in order to improve bonding of the polyurethane to the glass.

The assembling of the glass sheet coated with the anti-splinter film to the other elements of the laminated glazing pane is performed by stacking the constituent elements, followed by a conventional autoclave cycle.

When fracturing the inner glass sheet 3 is artificially induced and when the fractured pane is subjected to the different pressure stresses encountered during a usual flight, at no instant is any release of glass splinters from the fracture lines observed, the anti-splinter film perfectly fulfilling its function.

FIG. 2, in cross-section form, shows another embodiment of the glazing pane according to this invention, which is capable of being used as a windscreen (or front pane) for aircraft. This glazing pane 8 comprises a thermally semi-toughened glass sheet 9 which is 4 mm thick, a first intermediate layer 10 composed of 9 plies designated as 11 in the Figure, each 0.5 mm thick, of plasticized PVB containing 19.5 parts by weight of plasticizer to 100 parts by weight of PVB resin and of one ply 12, 0.76 mm thick, of plasticized PVB containing 39 parts by weight of plasticizer to 100 parts by weight resin. This ply 12 is in contact with a second chemically toughened glass sheet 13, 8 mm thick. (An analogous ply having a high plasticizer content may also be provided between the glass sheet 9 and the plies 11 of the intermediate layer). Between this second glass sheet 13 and a third glass sheet 14, which is also chemically toughened, there is disposed a second intermediate layer 15 comprising two outer plies 16, 17 in contact with the glass sheets 13, 14, of 0.76 mm thickness and formed of plasticized PVB having 39 parts by weight plasticizer per 100 parts by weight of PVB resin, and 6 internal plies 18, of 0.5 mm thickness, formed of PVB plasticized with 19.5 parts by weight of plasticizer per 100 parts by weight of PVB resin. The use of plies of PVB having a high plasticizer content (39 parts by weight) in contact with the glass sheets results in an improved resistance of the pane to fracture by cleavage of the glass. In a variant, the plies of PVB plasticized with 39 parts by weight may be replaced by plies of thermoplastic polyurethane.

The outer glass sheet 9 may comprise, on its inner face, a heating resistor, for example in the form of a heating conducting film 19, itself known.

The inner glass sheet 14 is provided, on its face intended to be towards the aircraft cabin, after treatment with a primer of the silane type, with an anti-splinter polyurethane film 20 of 200 μm thickness obtained by sputtering of a reaction mixture of an essentially trifunctional polyisocyanate, containing isocyanurate radicals based upon 1,6-hexamethylene diisocyanate having a free NCO radical content of 21.5% by weight, and of a trifunctional polycaprolactone having a free OH radical content of 9.3% by weight. The ratio NCO/OH is 1. There are previously added, as additives to the polycaprolactone, 0.015% by weight relative to the weight of the polycaprolactone, of dibutyl tin dilaurate as reaction catalyst, 0.1% by weight of a fluoroalkylated ester as spreading agent, and 1% by weight of bis(1,2,2,6,6,-pentamethyl-4-piperidyl) sebacate as protection agent against light.

The film is polymerized by heating to a temperature of 120° for 20 minutes.

The production of the anti-splinter film is preferably performed on the glass sheet before it is assembled with the other constituent elements of the pane. The anti-splinter film can then ensure its function as a protective film for the surface of the glass sheet at a very early stage, in particular before any handling of the sheet for the assembling operation. The assembling of the pane is completed by subjecting the pane to a conventional autoclave cycle.

An analogous laminated safety pane may be produced by using an anti-splinter sheet of thermosetting polyurethane, produced in advance on a suitable shaping support, by being associated with a film of polyurethane having adhesion properties for its later assembling with the glass sheet 14.

The assembling of the polyurethane sheet with the glass sheet may then be achieved by calendering, a technique that is well known in the manufacture of laminated panes known as asymmetric panes of glass and plastics.

The pane according to FIG. 2 may be used as windscreen or lateral glazing pane for a heavy transport aircraft with a pressurized cabin. In the case of a fracture of the inner glass sheet 14, any splinters that may be created are held on the glass sheet by the anti-splinter coating, whatever the conditions of pressurization of the cabin.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United State is:

1. A laminated safety pane for aircraft, comprising:
   a laminate of at least two bonded glass sheets, at least one of which sheets is chemically toughened and which is the glass sheet which faces the interior of the cabin, wherein a surface of said chemically toughened glass sheet is bonded by a plastic material selected from the group consisting of (i) a polyvinyl butyral having a plasticizer content ranging from 30 to 45 parts by weight of plasticizer per 100 parts by weight of polyvinylbutyral resin and (ii) a thermoplastic polyurethanes to an intermediate thermoplastic sheet of a polyvinylbutyral having a plasticizer content less than 30 parts by weight of plasticizer per 100 parts by weight of polyvinylbutyral resin, the surface of said chemically toughened glass sheet facing the interior of the cabin, having been treated with a silane primer, being coated with a layer of a transparent anti-splinter and protective covering of a polyurethane having a thickness of 50 μm to 600 μm and selected from the group consisting of (i) an aliphatic polyurethane resulting from the polycondensation of a biuret of 1,6-hexamethylene diisocyanate containing from 21 to 24% by weight of NCO radicals, with a branched aliphatic hydroxylated polyether resulting from the condensation of propylene oxide with trimethylolpropane, said polyether containing approximately from 10.5 to 12% by weight of hydroxyl radicals, the NCO/OH ratio expressed by weight ranging from 0.9 to 1.1 and (ii) a polyurethane formed from a reaction mixture comprising an isocyanate component selected from the group consisting of the biurets or the trifunctional isocyanurates of 1,6-hexamethylene diisocyanate, having an NCO radical content of 15 to 25% by weight and a polyol component selected from the group consisting of polyester polyols with a functionality greater than 2 having an OH radical content of 3 to 12% by weight, the reaction mixture having an NCO/OH ratio expressed in equivalents of 0.9 to 1.1, said polyurethane being elastically deformable, and having a modulus of elasticity of less than 2,000 daN/cm$^2$ and an elongation at rupture exceeding 60% with less than 2% plastic deformation.

2. The laminated pane according to claim 1, wherein the plastic material is plasticized polyvinylbutyral.

3. The laminated pane according to claim 1, wherein the anti-splinter and protective polyurethane film is sputtered onto a surface of the glass pane facing the interior of the cabin.

4. The laminated pane according to claim 1, wherein the anti-splinter and protective polyurethane film is in the form of a prefabricated sheet.

* * * * *